United States Patent [19]

Banse

[11] Patent Number: 5,375,467
[45] Date of Patent: Dec. 27, 1994

[54] FUEL TANK SENDER ASSEMBLY

[75] Inventor: Permjit S. Banse, Billericay, Great Britain

[73] Assignee: Ford Motor Company, Dearborn, Mich.

[21] Appl. No.: 150,647

[22] Filed: Nov. 10, 1993

[30] Foreign Application Priority Data

Nov. 12, 1992 [GB] United Kingdom ............... 9223768

[51] Int. Cl.⁵ .................... G01F 23/36; G01F 23/32
[52] U.S. Cl. ..................... 73/290 R; 73/317
[58] Field of Search ............. 73/290 R, 305, 317, 73/318; 248/295.1

[56] References Cited

U.S. PATENT DOCUMENTS

| | | | |
|---|---|---|---|
| 2,098,085 | 11/1937 | D'Arcey | 73/317 |
| 2,897,853 | 8/1959 | Anstine | 73/294 |
| 3,630,476 | 12/1971 | Lococo | |
| 4,154,103 | 5/1979 | Fling | 73/315 |
| 4,790,185 | 12/1988 | Fedelem et al. | 73/317 |
| 4,841,771 | 6/1989 | Glover et al. | 73/317 |
| 4,928,526 | 5/1990 | Weaver | 73/317 |
| 4,939,932 | 7/1990 | Ritzenthaler et al. | 73/317 |
| 5,152,170 | 10/1992 | Liu | 73/317 |
| 5,216,919 | 6/1993 | Nelson et al. | 73/317 |
| 5,272,918 | 12/1993 | Gaston et al. | 73/317 |

FOREIGN PATENT DOCUMENTS

| | | | |
|---|---|---|---|
| 0505265 | 9/1992 | European Pat. Off. | 73/305 |
| 2004064A | 3/1979 | United Kingdom. | |
| 2236856A | 4/1991 | United Kingdom. | |

Primary Examiner—Diego F. F. Gutierrez
Attorney, Agent, or Firm—David B. Kelley; Roger L. May

[57] ABSTRACT

A bottom referencing fuel tank sender assembly has a first bracket and a second bracket which are slidable relative to one another. The second bracket is biased against the floor of the tank and carries the sender assembly. Both brackets are meal pressings, with the guides for guiding the relative movement being formed by the material of the brackets themselves.

8 Claims, 2 Drawing Sheets

FUEL TANK SENDER ASSEMBLY

FIELD OF THE INVENTION

This invention relates to a fuel tank sender assembly for a motor vehicle fuel tank.

BACKGROUND OF THE INVENTION

A fuel tank sender assembly is conventionally mounted in a fuel tank through an opening in an upper wall of the tank. Ideally, the sender assembly should accurately indicate the volume of fuel remaining in the tank at any time, even when the fuel tank flexes in use, for example, due to varying fuel volume or changes in internal pressure due to external ambient conditions. Therefore, it is important that the assembly should be correctly positioned relative to the floor of the tank in order to accurately indicate fuel level.

It is known to use a so-called bottom referencing mechanism which ensures that the part of the assembly which follows the level of the fuel is always in contact with the floor of the fuel tank.

BRIEF SUMMARY OF THE INVENTION

The present invention provides a bottom referencing fuel sender assembly which is easy to manufacture and install. In addition, it requires a minimal number of parts, all of which are inexpensively manufactured. According to the present invention, there is provided a fuel tank sender assembly for a motor vehicle fuel tank, the assembly comprising a first bracket to be mounted to a top wall of the tank, a second bracket mounted on the first bracket for vertical slidable movement relative to the first bracket, the second bracket being biased, in use, against the bottom wall of the fuel tank when the first bracket is mounted on the second bracket. Both the first and second brackets are preferably made from pressed metal and the second bracket is guided for slidable movement relative to the first bracket by guide rails pressed out from the metal of the first bracket.

The use of relatively slidable pressed metal parts allows for production of a low cost but effective bottom sensing mechanism which is not affected by the fuel in which it is immersed. The second bracket preferably includes a tongue which can be deformed after the two brackets have been fitted together to limit the slidable movement between the two brackets. The tongue preferably engages against a pressed-out stop lug on the first bracket.

A tension spring may be mounted between the first and second brackets to provide the biasing force.

The second bracket may have a plastic foot to abut against the bottom wall of the fuel tank.

The fuel sender mechanism is preferably mounted on an arm of the second bracket which is formed from the same piece of metal as the remainder of the first bracket to provide a bottom referenced indication of fuel level in said fuel tank.

The second bracket preferably has a top-hat cross-section, with the outer flanges of the section guided by guide rails on the first bracket.

DETAILED DESCRIPTION OF THE PREFERRED EMBODIMENTS

Figure 1:
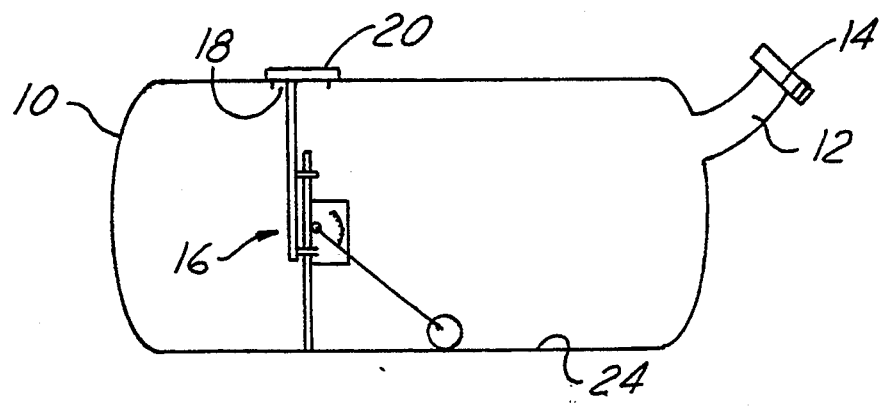
FIG. 1 is a schematic view of a section through a fuel tank incorporating a sender assembly in accordance with the present invention.

FIG. 1 shows a fuel tank 10 which may be molded of plastic such as a high density polyethylene, or may be of pressed steel or any other material known to those skilled in the art and suggested by this disclosure. The tank includes filler neck 12 with cap 14. Sender assembly 16 is mounted inside the tank and is inserted into tank 10 through aperture 18 in top wall 25 of tank 10. Closure plate 20 closes aperture 18 when sender assembly 16 is in place. The dimensions of sender assembly 16 are related to the depth of tank 10 such that when cover plate 20 is in position over opening 18, foot 22 (FIG. 2) of sender assembly 16 is in contact with tank bottom wall 24.

Figure 2:
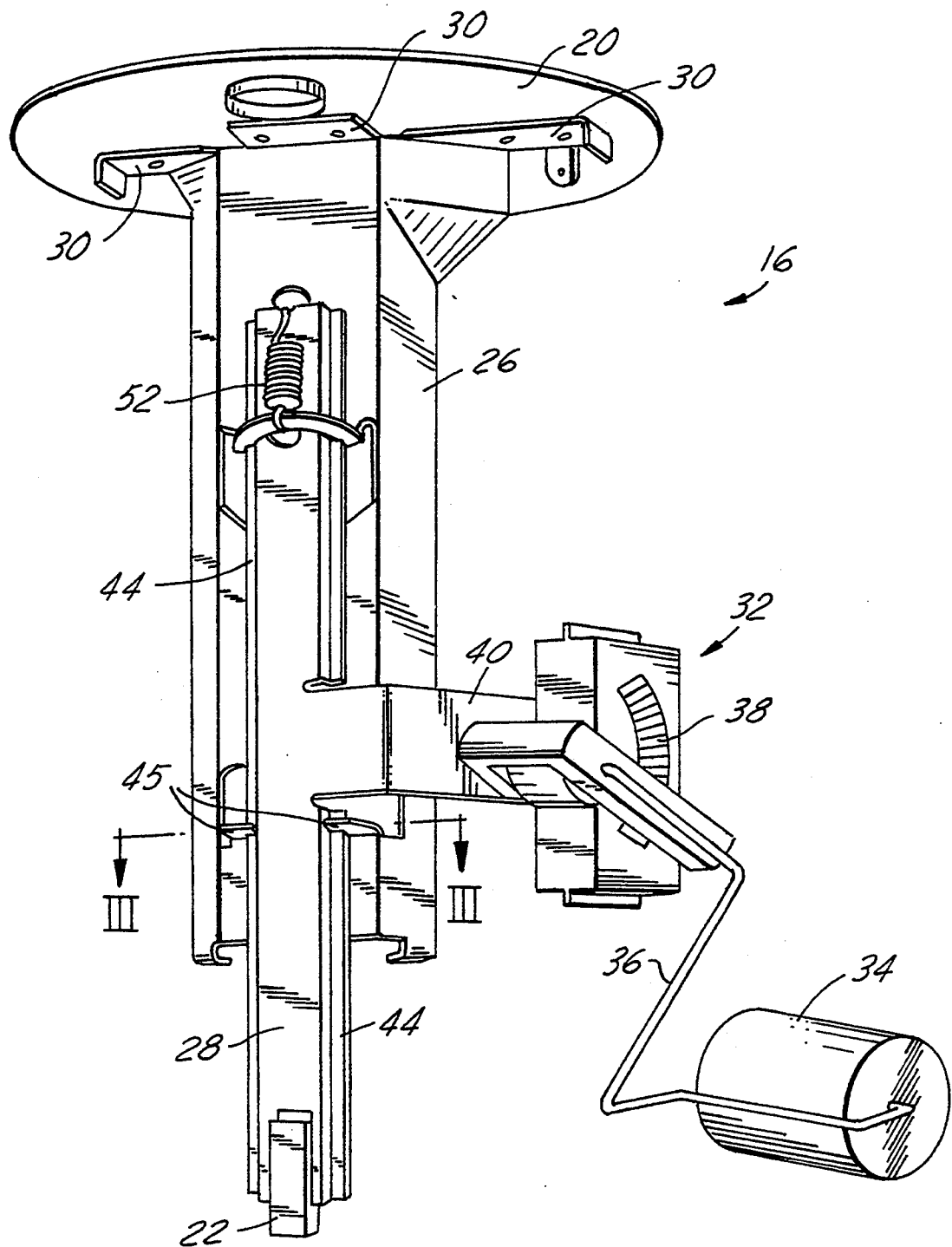
FIG. 2 is a perspective view of a sender assembly according to the invention.

Sender assembly 16, as shown in FIG. 2, comprises a first bracket 26 and a second bracket 28. First bracket 26 is formed from a single piece of sheet metal in the shape shown, and has upper flanges 30 which are welded to the underside of cover plate 20. First bracket 26 therefore hangs from the underside of cover plate 20.

Second bracket 28 is slidable relative to first bracket 26 along an axis, referred to as vertical for purposes of this invention, between cover plate 20 and tank bottom wall 24. Second bracket 28 carries fuel level sender mechanism 32 which has float 34 at the end of float arm 36. Contact on float arm 36 travels over a resistor card 38 in a manner known to those skilled in the art. Sender mechanism 32 is carried on side arm 40 of second bracket 28.

Figure 3:
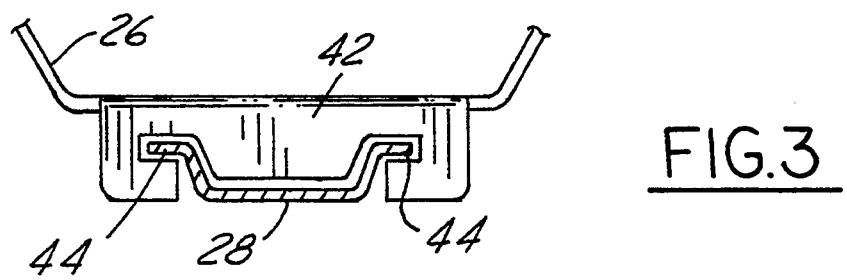
FIG. 3 is a section through the assembly of FIG. 2 on the lines III—III.

Like first bracket 26, second bracket 28 is formed from a single sheet of metal suitably formed. As can be seen in FIG. 3, second bracket 28 has a generally top-hat shaped section and is guided by guide lug 42 and flanges 45 which are pressed-out from the metal of first bracket 26. Outer flanges 44 of second bracket 28 are thus guided in corresponding rails 43 formed on first bracket 26.

Figure 4:
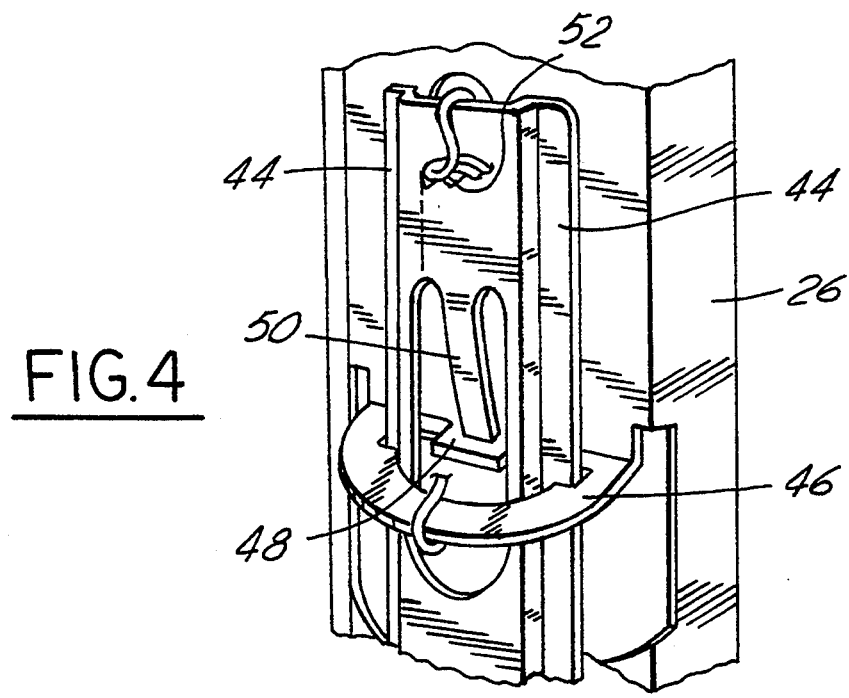
FIG. 4 is a detailed view of an upper part of the assembly with a biasing spring partly broken away.

Referring now to FIG. 4, first bracket 26 has an upper guide 46, which is also pressed-out of the metal of first bracket 26. Upper guide 46 also incorporates a stop lug 48, which is again part of first bracket 26, for engaging deformable tongue 50 of second bracket 28. Tongue 50 is bent to engage stop lug 48 after assembly of brackets 26 and 28 so as to limit movement of second bracket 28 toward tank bottom wall 24 relative to first bracket 26.

Spring 52 biases second bracket 28 in a direction toward tank bottom wall 24. Spring 52 hooks over top portion of second bracket 28 and attaches to upper guide 46, as shown in FIG. 4.

In use, when sender assembly 16 is positioned in tank 10, foot 22 will first make contact with tank bottom wall 24, and as closure plate 20 is brought into position to cover opening 18, first bracket 26 will be pushed down into tank 10 and will move toward tank bottom wall 24 relative to second bracket 28, which is restrained by its contact with tank bottom wall 24. Spring 52 will therefore extend and will provide a permanent biasing force which will keep foot 22 of second bracket 28 in permanent contact with tank bottom wall 24, even though spacing between the top and bottom wall of tank 10 may vary depending on the weight of fuel in tank 10, the internal pressure in tank 10, or other factors. Because second bracket 28 will follow the position of tank bottom wall 24 in this way, sender mechanism 32 will always provide an output representative of the volume of fuel referred to tank bottom wall 24. The use of simple metal pressings in this way provides a low cost but effective mechanism for bottom referencing the sender assembly 16.

While the invention has been shown and described in its preferred embodiments, it will be clear to those skilled in the arts to which it pertains that many modifications and changes may be made thereto without departing from the scope of the invention.

I claim:

1. A fuel tank sender assembly for a motor vehicle fuel tank comprising:
   a first bracket mounted to a top wall of said tank; a second bracket mounted in at least one guide rail on said first bracket for vertical slidable movement relative to said first bracket;
   a deformable tongue member on said second bracket for limiting movement between said second bracket and said first bracket.
   means for biasing said second bracket against a bottom wall of said fuel tank when said first bracket is mounted on said top wall; and
   a fuel sender mechanism mounted on said second bracket to provide a bottom referenced indication of fuel level in said fuel tank.

2. A fuel tank sender assembly according to claim 1 wherein both said first bracket and said second bracket are made from pressed metal parts.

3. A fuel tank sender assembly according to claim 2 wherein said at least one guide rail is pressed out from the metal of said first bracket.

4. A fuel tank sender assembly according to claim 1 wherein said deformable tongue member engages a pressed-out stop lug on the first bracket.

5. A fuel tank sender assembly according to claim 1 wherein said means for biasing comprises a tension spring connecting said first and second brackets.

6. A fuel tank sender assembly according to claim 1 wherein said second bracket has a plastic foot to abut against said bottom wall of said fuel tank.

7. A fuel tank sender assembly according to claim 1 wherein said fuel sender mechanism is mounted on an arm portion of said second bracket.

8. A fuel tank sender assembly according to claim 1 wherein the second bracket has a top-hat shaped cross-section, with the outer flanges of said cross-section being guided in said at least one guide rail on said first bracket.

* * * * *